Dec. 31, 1968 W. R. BEALL 3,419,859

MESSAGE ANNUNCIATOR OR SIGNAL UNIT

Filed July 19, 1965

INVENTOR.
WILLIAM R. BEALL
BY
Fred K. Schwend 3,419,859

MESSAGE ANNUNCIATOR OR SIGNAL UNIT

William R. Beall, 649 Solway St., Glendale, Calif. 91206

Filed July 19, 1965, Ser. No. 473,153
4 Claims. (Cl. 340—381)

ABSTRACT OF THE DISCLOSURE

A lamp signal unit for mounting on a panel where the electrical components for operating the lamp are located in the head of the device, in front of the panel and surrounding the signal lamp. The lamp, head, and body are configured such that minimum space is occupied by the unit at the rear of the panel and maximum size is given to the head or message area of the device.

This invention relates to panel mounted annunicator or signal units and has particular reference to miniature panel mounted units of this type capable of being controlled by very low currents and/or voltages which are incapable in themselves of illuminating such units.

Panel mounted units of the above type are in common use in association with computer equipment, signalling systems, automatic control equipment, etc., in which available output power is of a relatively low order. In such cases, power amplifying equipment is generally supplied in association with the unit to effect illumination. Heretofore, such amplifying equipment has generally been mounted on the panel or in an assembly embodying the lamp. In either case, however, the amplifier or voltage control equipment was relatively bulky, taking up considerably more room than the illuminating lamp. Also, the amplifying equipment and its housing extended to the rear of the panel which is usually found to contain a considerable amount of wiring and other components, thereby requiring extra room for the installation of the signal unit. This becomes a particular problem in cases where such signal units are crowded closely together and/or are located close to associated instruments or equipment.

Also, problems are encountered due to the heat developed by annunciator or signal lamps, especially of the incandescent type, when located in close proximity to transistors, diodes and other similar semiconductor equipment which is sensitive to heat.

It therefore becomes a principal object of the present invention to provide a miniature message annunicator or signal unit combined with amplifying equipment as an integral unit for controlling the lamp from extremely small voltages and/or currents.

Another object is to provide a unit of the above type which is highly compact and yet provides a maximum size illuminated message or legend area.

Another object is to provide a combined signal unit and amplifier therefor which is easy to mount on a support panel.

Another object is to provide a combined signal unit and amplifier which takes up a minimum of space at the rear of a supporting panel therefor.

Another object is to provide a miniature combined signal unit and amplifier which may be readily removed and inserted from the front of a supporting panel.

Another object is to provide a miniature panel mounted signal unit incorporating a lamp and amplifier arranged to effectively dissipate heat developed by the lamp and/or the amplifier components themselves.

The manner in which the above and other objects of the invention are accomplished will be readily understood on reference to the following specification when read in conjunction with the accompanying drawings, wherein.

Figures 1, 2, 3, 4, 5, 6:
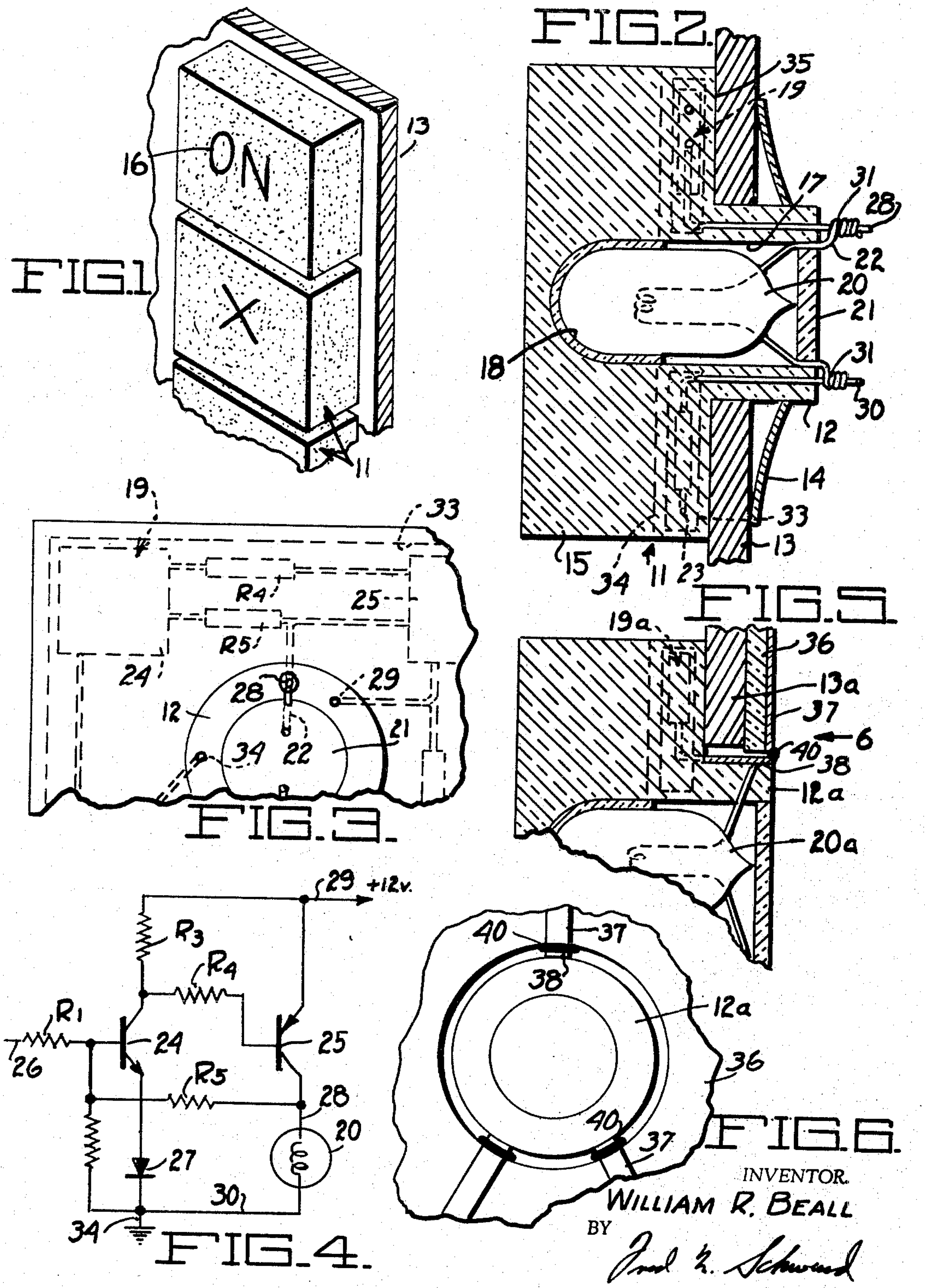
FIG. 1 is a perspective view of a portion of a panel on which are mounted several signal units embodying a preferred form of the present invention.
FIG. 2 is a sectional view through one of the signal units.
FIG. 3 is a rear view, partly broken away, of a signal unit.
FIG. 4 is a schematic view illustrating an exemplary circuit incorporated in the signal unit.
FIG. 5 is a sectional view similar to FIG. 2, but with parts broken away, illustrating a modified form of the invention.
FIG. 6 is a fragmentary view taken in the direction of the arrow 6 of FIG. 5.

Referring to the drawings, the signal unit comprises an integral body preferably formed of molded plastic and including a rectangular head portion generally indicated at 11 and a rearwardly projecting tubular extension 12. The latter is cylindrical and is arranged to fit within a hole formed in a supporting panel 13 and to extend rearwardly of such panel.

A spring fastener 14, such as is commercially known as a "Tinnerman" fastener, is frictionally fitted over the extension 12 and presses against the rear surface of the panel 13 to draw the flat rear surface of the head portion 11 into intimate contact with the panel. Such a fastener is shown in detail in the U.S. patent to A.H. Tinnerman, No. 1,512,653, issued on Oct. 21, 1924.

Incorporated in the head portion 11 is a forward lens section 15 which may be either transparent or preferably translucent. A suitable legend 16 is impressed by silk-screen techniques, printing, or otherwise, on the front surface of the lens section in a color contrasting to the surface color of the lens section so as to be visible at all times. Such front surface is also preferably slightly roughened so that other legends or marks may be applied thereto as by the use of a pencil.

The extension 12 forms an axially extending cavity 17 which extends forwardly into the head portion 11 and a light transmitting colored plastic shell 18 is fitted into the forward end of such cavity to locate within the lens section 15. The shell receives and may partially support an incandescent lamp 20 located within the cavity. A plug 21 is removably fitted in the cavity to seal the interior thereof and to form a support for wire leads 22 leading to the lamp. The plug may also aid in holding the lamp in place.

The lamp 20 is adapted to be controlled relatively low currents such as is derived from micrologic elements or integrated circuits wherein it may be desirable to limit the current so drawn to 20 micro-amperes or less. For this purpose, an amplifier section generally indicated at 19 is embedded in the head portion 11 in a layer 23 thereof located to the rear of the lens section 15.

As an example of a circuit capable of controlling the lamp, reference may be had to FIG. 4 which illustrates an amplifier circuit which comprises an NPN transistor 24 coupled to a PNP transistor 25 through resistor R4. An input circuit 26 is connected through resistor R1 to the base of transistor 24. In such case, a negligible collector current is normally drawn through the transistor 24 so that a zero bias potential is applied through resistors R3 and R4 to the base of transistor 25 to thereby normally hold the latter in cutoff condition, thus holding the lamp 20 in non-illuminating condition. However, when a relatively weak positive signal is applied to the input 26, the transistor 24 will conduct to lower the potential applied to the base of transistor 25, causing the latter to conduct. A forward bias current will now flow from a power supply line 29 through the base of the latter, through resistor R4, transistor 24 and diode 27 to ground. This causes a large current flow into the collector of transistor 25 and through the lamp 20 to a ground conductor 34 to illuminate the lamp. As the voltage across the lamp builds up, a current flows through resistor R5 back to the base of transistor 24, forming a positive feedback which aids the original current applied to the input.

The foregoing electrical elements and leads connecting the same and forming the amplifier are embedded into the layer 23 in a form of relatively narrow width surrounding the cavity 17. For this purpose, the various elements may be first soldered or welded into an appropriate and operating amplifier structure and the body of the signal unit is thereafter molded around such structure to encapsulate the same. In this case, conductors 26, 29 and 34 are extended along the length of the extension 12 in the same manner as wire leads 28 and 30 for connection to external circuits. Leads 22 from the lamp 20 may be soldered or otherwise connected at 31 to the leads 28 and 30 connected in the lamp circuit of the amplifier.

Certain of the components, such as resistors, may be embedded in the wall of the extension.

An alternate method of incorporating the amplifier components into the head portion 11 is to initially encapsulate the amplifier structure in a flat disc-like body of plastic or the like, indicated by the dotted lines 33 and to thereafter mold such body into the main body of the signal unit during the molding process. Such molding may also include the lens section 15 or the latter may be formed separately and then glued or fused to the layer 23 along dotted lines 34.

The lens section 15 is preferably uncolored so that when no current is flowing through the lamp, the legend 16 appears against a neutrally colored background. However, when the lamp is illuminated, the entire lens section is illuminated in a color determined by the color of the shell 18.

Alternatively, the shell 18 may be omitted and the interior of the cavity 17 may be dyed to a desired color to produce the same effect as the shell.

Due to the relatively large area presented by the rear surface 35 of the head portion 11, heat developed by the lamp 20 and/or the amplifier components and transmitted through the plastic portion of the signal unit may be readily transmitted to the panel 13 which forms a heat sink for the unit.

It will be seen that the above described construction results in a highly compact signal unit which may be easily assembled to the front of the panel, leaving the rear of the panel free for wiring or other purposes. Further, this construction enables a number of signal units to be mounted in close proximity to each other on a panel and also provides a maximum size illuminated message area with a minimum size projection at the rear of the panel.

FIGS. 5 and 6 illustrate a modified form of the invention wherein a sheet 36 of insulating material having conductor strips 37 bonded thereon is attached to the rear surface of the panel 13*a* to form a part thereof. In this case, the extension 12*a* is preferably of such length that its rear surface terminates flush with the conductors 37. Conductor strips 38 are suitably bonded to the exterior surface of the extension 12*a* and are electrically connected to the amplifier circuit 19*a* and/or to the lamp 20*a*.

Upon assembly of the signal unit to the panel, solder fillets 40 are bonded between conductor strips 37 and strips 38 to form appropriate electrical connections and to also hold the signal unit in place.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A signal unit comprising:
a lens head adapted to be fitted against a panel,
an extension projecting rearwardly from said head and adapted to fit within a hole in said panel,
a cavity extending in said extension,
at least that portion of said head between the forward end of said cavity and the front surface of said head being of light transmitting material,
an electrical control device embedded in said head adjacent the rear surface thereof and located radially outwardly from said cavity, and
an electric lamp in said cavity,
said control device having an output connected to said lamp.

2. A signal unit according to claim 1 wherein said control circuit has an input conductor extending along the length of said extension and through the wall thereof.

3. A signal unit comprising:
a lens head adapted to be fitted against a panel,
an extension projecting rearwardly from said head and adapted to fit within a hole in said panel,
a cavity extending in said extension and partly into said head,
at least that portion of said head between the forward end of said cavity and the front surface of said head being of light transmitting material,
an electrical control device comprising a plurality of electrical components embedded in said head around said cavity, and
an electric lamp in said cavity,
said control device having an output connected to said lamp and an input extending along said extension for connection to a control voltage.

4. A signal unit comprising:
a lens head adapted to be fitted against the front surface of a panel,
said panel having first conductor strips along the rear surface thereof,
an extension projection rearwardly from said head and adapted to fit within a hole in said panel,
second conductor strips extending along the exterior surface of said extension,
a cavity in said extension,
at least that portion of said head between the forward end of said cavity and the front surface of said head being of light transmitting material,
an electrical control device embedded in said head adjacent the rear surface thereof and located radially outwardly of said cavity,
an electric lamp in said cavity,
said control device having an output connected to said lamp and an input connected to certain of said second conductor strips, and
means connecting said first and second conductor strips.

References Cited

UNITED STATES PATENTS

| | | | |
|---|---|---|---|
| 2,830,172 | 4/1958 | Stetson | 340—381 X |
| 2,985,874 | 5/1961 | Williams | 340—381 X |
| 3,246,319 | 4/1966 | Morrison et al. | 340—381 |

JOHN W. CALDWELL, *Primary Examiner.*

C. MARMELSTEIN, *Assistant Examiner.*